(12) United States Patent  
Duncan et al.

(10) Patent No.: US 6,481,738 B1  
(45) Date of Patent: Nov. 19, 2002

(54) CONNECTING DEVICE

(75) Inventors: Malcolm Duncan, Randburg (ZA);
Kenneth John Steel, Ballito (ZA);
Alan Edgar Laatz, Durban (ZA)

(73) Assignee: Excalibur Vehicle Accessories (Proprietary) Limited, RoodePoort (ZA)

( * ) Notice: Subject to any disclaimer, the term of this patent is extended or adjusted under 35 U.S.C. 154(b) by 0 days.

(21) Appl. No.: 09/719,579

(22) PCT Filed: Jun. 14, 1999

(86) PCT No.: PCT/ZA99/00045

§ 371 (c)(1),
(2), (4) Date: Mar. 6, 2001

(87) PCT Pub. No.: WO99/65714

PCT Pub. Date: Dec. 23, 1999

(30) Foreign Application Priority Data

Jun. 15, 1998 (ZA) ................................................ 98/5165

(51) Int. Cl.[7] .................................................. B60D 1/62
(52) U.S. Cl. ........................ 280/422; 280/420; 280/511; 439/8
(58) Field of Search ................................ 280/420, 422, 280/511; 701/36, 49; 315/80; 307/10.8; 340/431; 439/8

(56) References Cited

U.S. PATENT DOCUMENTS

| | | | | |
|---|---|---|---|---|
| 2,143,322 A | * | 1/1939 | Knobel, Jr. .................. | 280/513 |
| 2,673,965 A | * | 3/1954 | Cass ............................. | 439/8 |
| 3,116,940 A | * | 1/1964 | Jines .......................... | 280/422 |
| 3,328,741 A | | 6/1967 | Brown .......................... | 439/8 |
| 3,797,862 A | * | 3/1974 | Letterman .................... | 280/422 |
| 3,858,907 A | | 1/1975 | Van Raden ................. | 280/422 |
| 4,283,072 A | | 8/1981 | Deloach, Jr. ................ | 280/422 |
| 5,503,421 A | * | 4/1996 | DeLisser et al. .......... | 280/441.1 |
| 5,521,466 A | | 5/1996 | Vincent ....................... | 315/77 |
| 6,087,777 A | * | 7/2000 | Long .......................... | 384/173 |
| 6,097,283 A | * | 8/2000 | Szudarek et al. .......... | 340/431 |
| 6,177,865 B1 | * | 1/2001 | Bryant et al. .............. | 307/10.8 |
| 6,222,443 B1 | * | 4/2001 | Beeson et al. ............. | 340/431 |
| 6,232,722 B1 | * | 5/2001 | Bryant et al. .............. | 307/10.1 |

FOREIGN PATENT DOCUMENTS

| | | | |
|---|---|---|---|
| DE | 0483650 A1 | * | 5/1992 |
| EP | 0 692 396 A1 | | 1/1996 |
| GB | 789655 | | 1/1959 |

* cited by examiner

*Primary Examiner*—Kevin Hurley
*Assistant Examiner*—Daniel Yeagley
(74) *Attorney, Agent, or Firm*—Merchant & Gould P.C.

(57) ABSTRACT

This invention relates to a connecting device comprising first and second coupling members for connection to a towing and towed vehicle. The coupling members are lockingly engageable for connecting the vehicles in a towing relationship. A power supply conductor is provided for in use supplying power to rear lights of the towing vehicle. A pair of interengageable contacts are provided in the power supply conductor, one contact on each coupling member, the contacts engaging each other when the coupling members lockingly engage each other. A signal transmitter arrangement is provided for transmitting a control signal when power is supplied to a rear light provided on the towing vehicle. A signal receiver arrangement is provided for receiving the control signal and activating at least one rear light of the towed vehicle in accordance with the control signal.

15 Claims, 4 Drawing Sheets

CONNECTING DEVICE

TECHNICAL FIELD

This invention relates to a connecting device suitable for connecting two vehicles in a towing relationship to each other. More particularly it relates to such a device which includes an electrical coupling arrangement.

BACKGROUND ART

Many different tow hitches for connecting a towing vehicle to a towed vehicle are known. One known tow hitch comprises a mating ball and socket arrangement, the ball formation being secured to the rear end of the towing vehicle and the socket formation being secured to the front end of the towed vehicle. In use the vehicles are connected to each other by inserting the ball formation in the socket formation and locking them in a sliding engagement. Another known tow hitch comprises a so-called fifth wheel arrangement.

It is also well known that with road going vehicles, the towed vehicle (for example a caravan or trailer) is required to have lights, such as tail lights, stop lights, indicator lights and the like. These lights are connected to the towing vehicle's electrical system. When known tow hitches as described above are employed, a separate plug and socket arrangement with a plurality of contacts is provided for connecting the lights of the towed vehicle to the lights of the towing vehicle. A disadvantage of this system is that the user often forgets to connect the electrical system of the towed vehicle to that of the towing vehicle. These electrical connections are also prone to damage.

South African patent 96/1682 discloses a tow-hitch arrangement having two anchor arrangements one to be mounted to the towing vehicle and the other to the towed vehicle. The anchor arrangement includes complementary sliding contacts, which come into electrical contact with one another when the anchor arrangements are connected to each other. One disadvantage of this arrangement is that the anchor arrangements include a large number of parts to ensure that the contacts remain in contact with each other. Another disadvantage is that direct contact is established between the lights of the two vehicles, for example, the brake lights of the one vehicle is connected directly to the brake lights of the other vehicle etc. which may result in power drain which in turn may prevent the lights of the towed vehicle from being sufficiently illuminated. A further disadvantage is that many pairs of contacts have to be provided.

U.K. patent 789,655 discloses a coupling wherein a ball member of the coupling has a holding bolt through it, and insulated therefrom. The head of the bolt forms a portion of the periphery of the ball with a wide insulation between such head and ball.

U.S. Pat. No. 5,521,466 discloses an apparatus for actuating a plurality of operating lamps of a towed vehicle according to the operating fights of a towing vehicle. The apparatus includes an encoder and decoder arrangement for actuating the lights of the towed vehicle. This apparatus again has the disadvantage that a separate electrical coupling and tow hitch needs to be provided. Another disadvantage is that a number of electrical couplings need to be provided between the vehicles, at least one for the power line and at least one for the signals from the encoder to the decoder.

EP-A-0 692 396 discloses an electrical trailer connection device which includes one or more data network connections for connection to the data network of the tow vehicle. A control unit is provided which is capable of controlling a semiconductor power switch group in dependence on control information received via the data network connections. In this way only a few connections, e.g. three of four, to the tow vehicle are required which simplifies fitting and reduces the amount of cabling. Multiple connections between the tow vehicle and trailer is provided via the connection contact unit.

It is an object of the present invention to provide an alternative connecting device which overcomes or reduces at least some of the above disadvantages.

DISCLOSURE OF INVENTION

According to the present invention there is provided a connecting device suitable for connecting a towing vehicle with rear lights in a towing relationship to a towed vehicle with rear lights and for actuating the rear lights of the towed vehicle in accordance with the rear lights of the towing vehicle, the connecting device comprising a first coupling member connected or connectable to the towing vehicle; a second coupling member connected or connectable to the towed vehicle, which coupling members are lockingly engageable for connecting the vehicles in a towing relationship; a power supply conductor for supplying power to the rear lights of the towed vehicle from a power supply on the towing vehicle; a pair of interengageable electrical contacts provided in the power supply conductor, the pair including a first contact provided on the first coupling member and a second contact provided on the second coupling member, the first and second contacts engaging each other when the first and second coupling members lockingly engage each other to allow power to flow through the pair of contacts; a signal transmitter arrangement for transmitting at least one control signal when power is supplied to at least one rear light of the towing vehicle to activate it; and a signal receiver arrangement for receiving the at least one control signal from the transmitter arrangement and activating at least one rear light of the towed vehicle in accordance with the at least one control signal received.

In this specification the terms "tow" or "towing" relate to both pull and push arrangements.

The towing vehicle may be a vehicle which in turn is towed by another vehicle. Alternatively it may comprise a vehicle which includes a propelling means for propelling the vehicle. Preferably the vehicle comprises a road-going vehicle, for example a motor car, truck, light delivery vehicle or the like. The towed vehicle may comprise any suitable towed vehicle and may include a trailer, caravan or the like.

The rear lights on the towing and towed vehicle may include a number of lights selected from the group comprising one or more tail lights; one or more brake lights; one or more indicator lights; one or more reverse lights and a number plate light. Usually at least two tail lights, two brake lights and two indicator lights are provided at the rear ends of the vehicles.

The first and second coupling members may comprise a fifth wheel and pin arrangement, for example a conventional fifth wheel and pin arrangement. Alternatively the first and second coupling members may comprise a ball and socket arrangement, for example a conventional ball and socket arrangement.

The power supply conductor may comprise an electrical wire having a conductive core in an insulating cover. The power supply conductor may also provide power to other equipment on the towed vehicle such as a refrigerator.

A switch may be provided in the power supply conductor to regulate current flow through the power supply conductor, preferably regulating power supply to the first contact.

Preferably the pair of interengageable electrical contacts slidingly engage each other. Preferably at least one of the contacts include a biasing means for biasing the one contact onto the other. The biasing means may comprise a spring.

In a preferred embodiment of the invention the device includes only one pair of electrical contacts between the first and second coupling members through which the control and power signals pass. Additional earth contacts may be provided.

The signal transmitter arrangement may include an encoder receiving information of the status of the power supplied to the rear lights of the towing vehicle and the encoder in response thereto generating a signal carrying information corresponding to the status of the rear lights. The encoder may include as inputs lines connected to the power lines supplying power to the rear lights of the towing vehicle.

The encoder may comprise a microprocessor.

The signal generated by the encoder may carry information corresponding to the specific combination of the status of power supplied to the rear lights of the towing vehicle. For example, the signal may be responsive to which rear lights power is supplied. Alternatively or additionally it may be responsive to which rear lights power is not supplied.

The signal transmitter arrangement may transmit the at least one control signal via the air to the receiver. Preferably the at least one control signal is transmitted via a transmission line. A separate transmission line may be provided for transmitting the at least one control signal and suitable contacts (for example of the type in the power line) may be provided in the signal transmission line to establish contact in the line between the towing vehicle and the towed vehicle.

Preferably however the at least one control signal is transmitted via the power supply conductor to the signal receiver arrangement. The at least one control signal is preferably superimposed on the power signal in the power supply conductor, that is the power signal is modulated with said at least one control signal. Preferably the signal transmitter arrangement includes a timer arrangement for generating an oscillating control signal which is superimposed on the power signal.

The signal transmission arrangement may also include current amplification means for amplifying the control signal. The current amplifying means may comprise a transistor arrangement.

The signal receiver arrangement may include a decoder for decoding the control signal received from the transmitter and for controlling switches in power lines for supplying power to the rear lights of the towed vehicle, thereby to supply power to the said rear lights in accordance with the control signal received.

The signal receiver arrangement may include means for separating the control signal from the power signal. The separating means may comprise a filter arrangement and the filter arrangement may comprise a RC filter.

The signal receiver arrangement may also include means for amplifying the separated control signal. The amplifying means may comprise an op-amp circuit.

The decoder may comprise a microprocessor.

The signal receiver arrangement may include a current amplifying means for amplifying power output from the microprocessor. The current amplifying means may comprise transistor drivers.

The connecting device may also include a test arrangement whereby the signal transmitter arrangement is activated to send one or more control signals to activate the rear lights of the towing vehicle allowing the user to check whether they work. Preferably the rear lights may be activated one after the other and preferably in sequence.

The connecting device may also include a warning arrangement to provide a warning if the towed vehicle is connected to the towing vehicle but the contacts 17 and 18 do not allow power through.

According to another aspect of the present invention there is provided a first part of a connecting device which in use connects with a second part of a connecting device to connect a towing vehicle with rear lights in a towing relationship to a towed vehicle, the first part comprising a first coupling member connectable to a towing vehicle and being suitable to lockingly engage a second coupling member on a towed vehicle for connecting the vehicles in a towing relationship; a power supply conductor through which power can be supplied; a first electrical contact in the power supply conductor which contact is located on the a first coupling member in use to engage a second electrical contact on the second coupling member when the first and second coupling members lockingly engage each other; and a signal transmitter arrangement in use associated with rear fights of the towing vehicle for transmitting at least one control signal which signals to which rear lights of the towing vehicle power is supplied.

According to another aspect of the present invention there is provided a second part of a connecting device which in use connects with a first part of a connecting device to connect a towing vehicle with rear lights to a towed vehicle with rear lights in a towing relationship, the second part comprising a second coupling member connectable to a towed vehicle and being suitable to lockingly engage a first coupling member on a towing vehicle for connecting the vehicles in a towing relationship; a power supply conductor through which power can be supplied; a second electrical contact in the power supply conductor which contact is located on the second coupling member in use to engage a first electrical contact on the first coupling member when the first and second coupling members lockingly engage each other; and a signal receiver arrangement for receiving a control signal which signals to which rear lights of the towing vehicle power is supplied and the signal receiver arrangement in use activating at least one rear light of the towed vehicle in accordance with the control signal received.

According to another aspect of the present invention there is provided a vehicle equipped with the first part of a connecting device substantially as described hereinabove.

According to another aspect of the present invention there is provided a vehicle equipped with the second part of the connecting device substantially as described hereinabove.

According to another aspect of the present invention a coupling member suitable for lockingly engaging a mating coupling member to allow two vehicles to be connected to each other in a towing relationship comprises a ball formation on one end of a shank, an electrical contact provided on the ball formation and a conductor for supplying power to the contact extending at least partly through the ball formation.

Without thereby limiting the scope of the invention and by means of example only, one embodiment thereof will now be further described with reference to the accompanying drawings wherein:

BRIEF DESCRIPTION OF THE DRAWINGS

In the accompanying drawings the same reference numerals are used to denote corresponding parts.

BEST MODE FOR CARRYING OUT THE INVENTION

Figure 1:
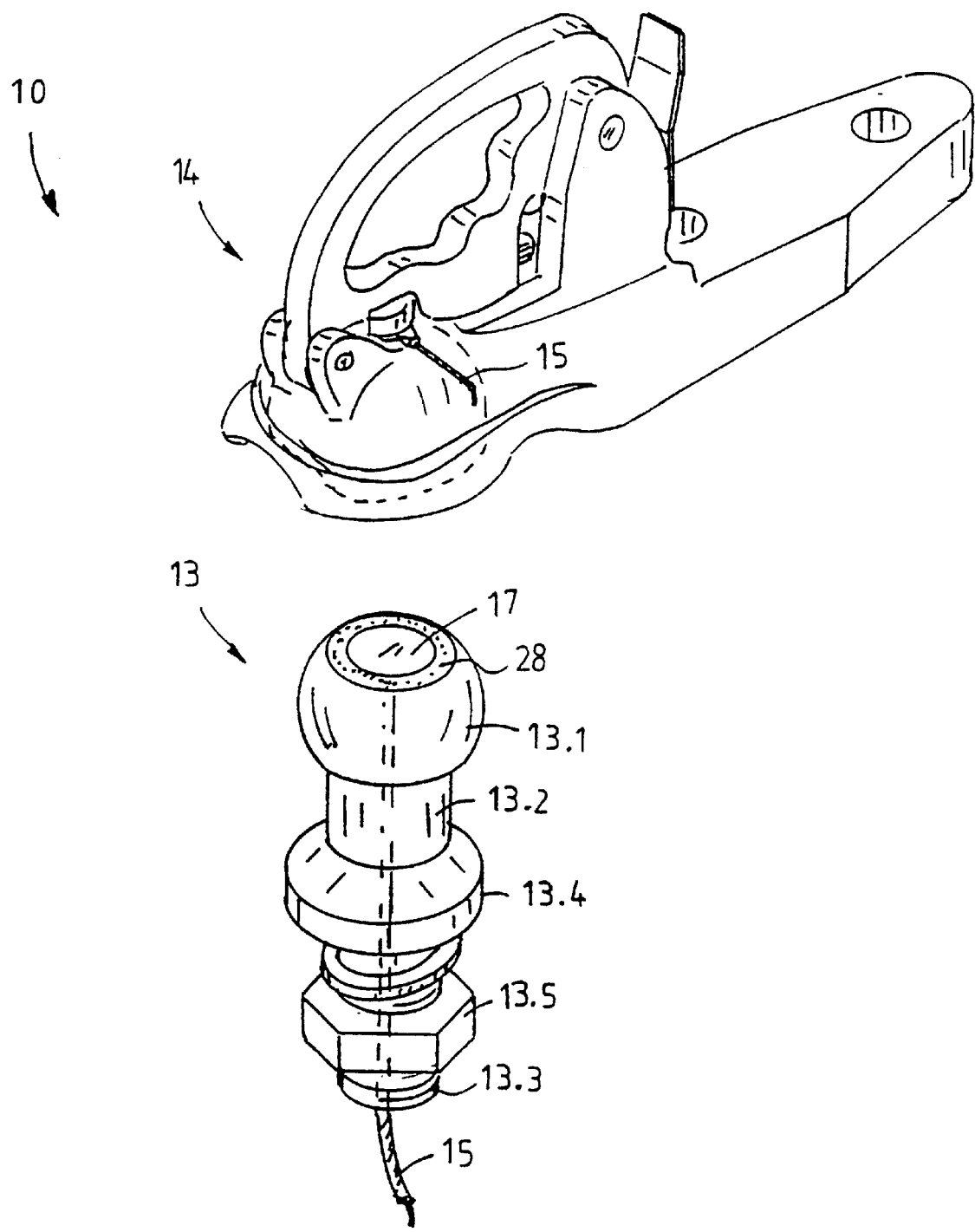
FIG. 1 is a perspective view of first and second coupling members of a connecting device according to the invention.

Referring now to the drawings there is provided a connecting device 10 for connecting a towing vehicle [not shown] with rear lights 11 in a towing relationship to a towed vehicle [not shown] with rear lights 12. The connecting device 10 also actuates the rear lights 12 of the towed vehicle in accordance with the rear lights 11 of the towing vehicle.

The connecting device 10 comprises a first coupling member 13 connectable to the towing vehicle and a second coupling member 14 connectable to the towed vehicle. In use the locking members 13 and 14 lockingly engage each other to connect the vehicles in a towing relationship. A power supply conductor 15 in use supplies power to the rear lights of 12 of the towed vehicle from a power supply in the form of a battery 16 on the towing vehicle. A pair of interengageable contacts 17 and 18 are provided. The first electrical contact 17 is located on the first coupling member 13 and the second electrical contact 18 is provided on the second coupling member 14. The first and second contacts 17 and 18 engage each other when the first and second coupling members 13 and 14 lockingly engage each other, thereby allowing power to flow through the pair of contacts. A signal transmitter arrangement 19 transmits at least one control signal when current is supplied to at least one rear light 11 of the towing vehicle to activate it. A signal receiver arrangement 20 receives the at least one control signal from the transmitter arrangement 19 and activates at least one rear light 12 of the towed vehicle in accordance with the at least one control signal received.

The rear lights 11 and 12 may include lights such as tail lights, brake lights, indicator lights, reverse lights and a number plate light. The arrangement is such that in use when for example, the brake lights of the towing vehicle are activated, the device 10 will activate the brake lights of the towed vehicle. The same is also true for the other types of lights.

In this embodiment of the invention the first coupling member 13 comprises a ball member and the second coupling member 14 comprises a socket member for lockingly receiving the ball member in the receptacle 24. Except for the modifications relating to and associated with the controls 17 and 18 the ball member and socket member are of the conventional type and accordingly they are not described in full detail. In the present embodiment of the invention a contact 21 is provided in the socket member 14 which in use serves as an earth contact. The contact 21 is slidingly mounted in an aperture 22 and a biasing means in the form of a spring 23 biases the contact 21 into the receptacle 24. In use the contact 21 will bear on the ball member 13 adjacent to the contact 17.

The ball member 13 comprises a ball formation 13.1 on a shank 13.2. Fastening means in the form of a screw thread 13.3 on the shank 13.2, a collar formation 13.4 and a nut 13.5 is provided for securing the ball member 13 to a towing vehicle.

The power supply conductor 15 in use extends from the battery 16 to the first contact 17 on the coupling member 13. A conduit 25 is provided in the coupling member 13 for receiving the power supply conductor 15 therethrough. The power supply conductor 15 further extends from the second coupling member 14 and is operatively connected to the signal receiver arrangement 20. It is also connected to the lights 12 via switches 26. The power supply conductor 15 is an electrical wire having a conductive core with an insulating cover over the conductive core.

Figure 2:
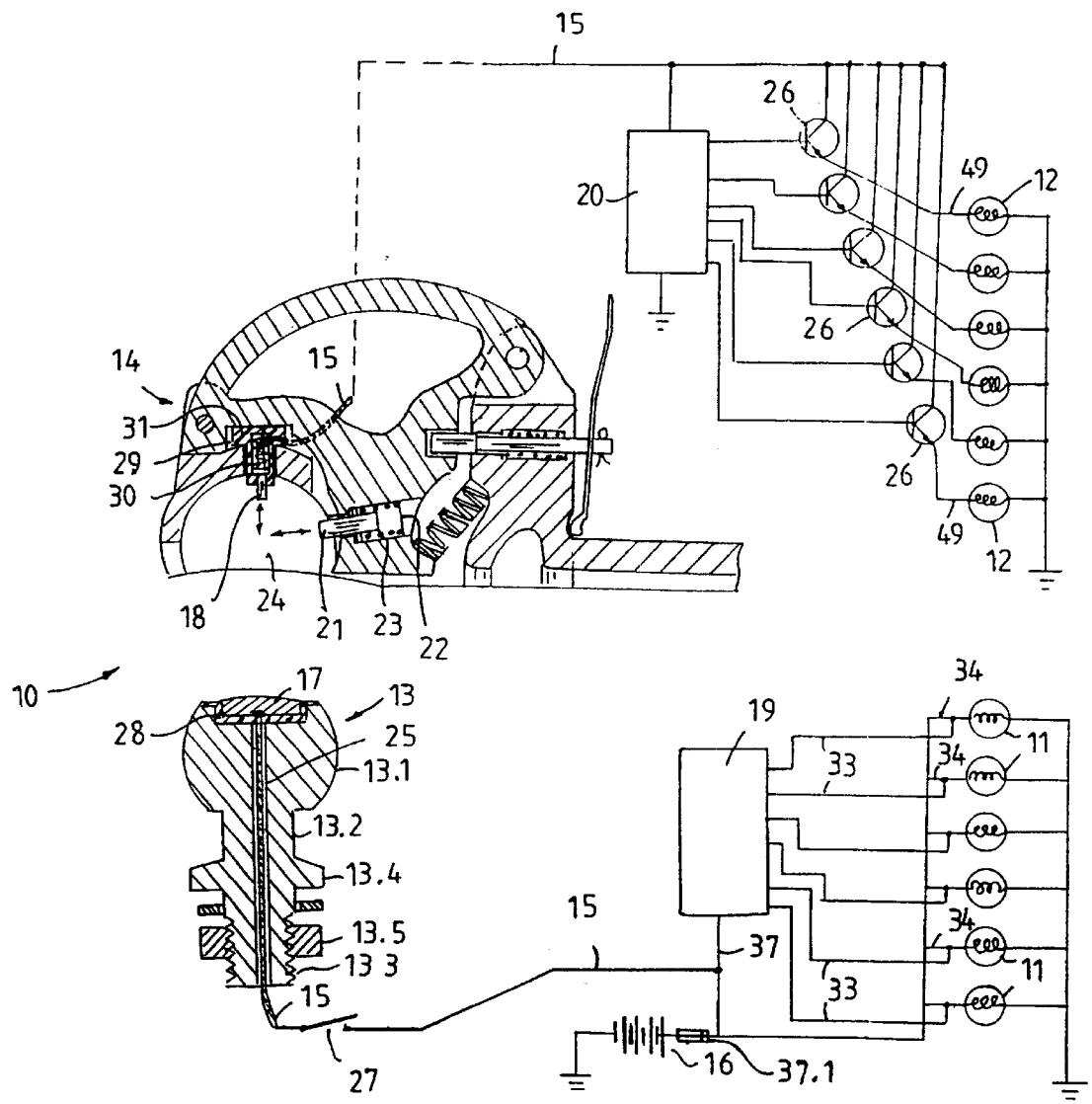
FIG. 2 is sectioned side view of the coupling members of FIG. 1 and diagrammatically setting out the circuit diagram of the connecting device according to the invention.
Figure 3:
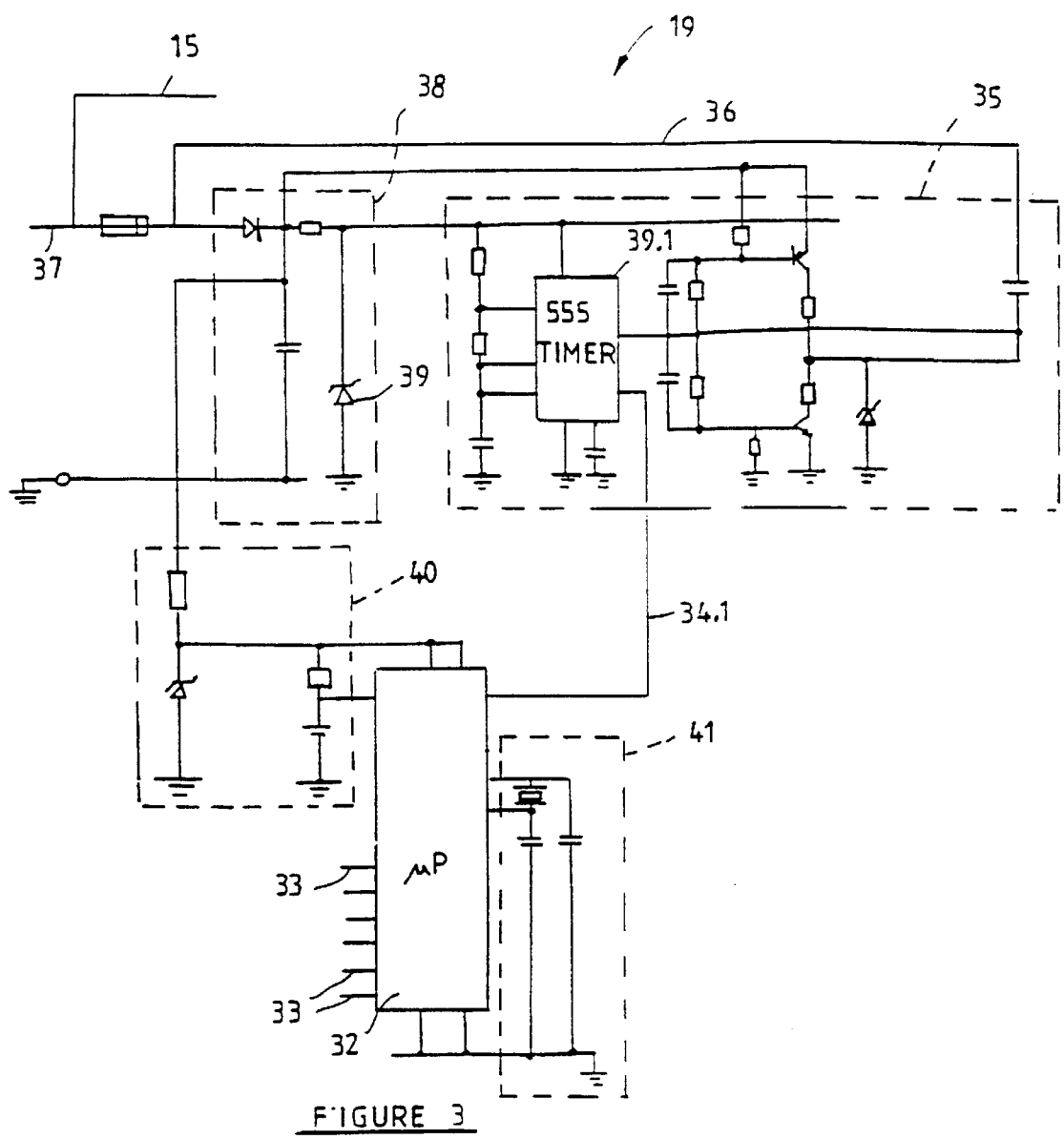
FIG. 3 is a circuit diagram of the part of the connecting device of FIG. 2 associated with the signal transmitter arrangement of the connecting device.
Figure 4:
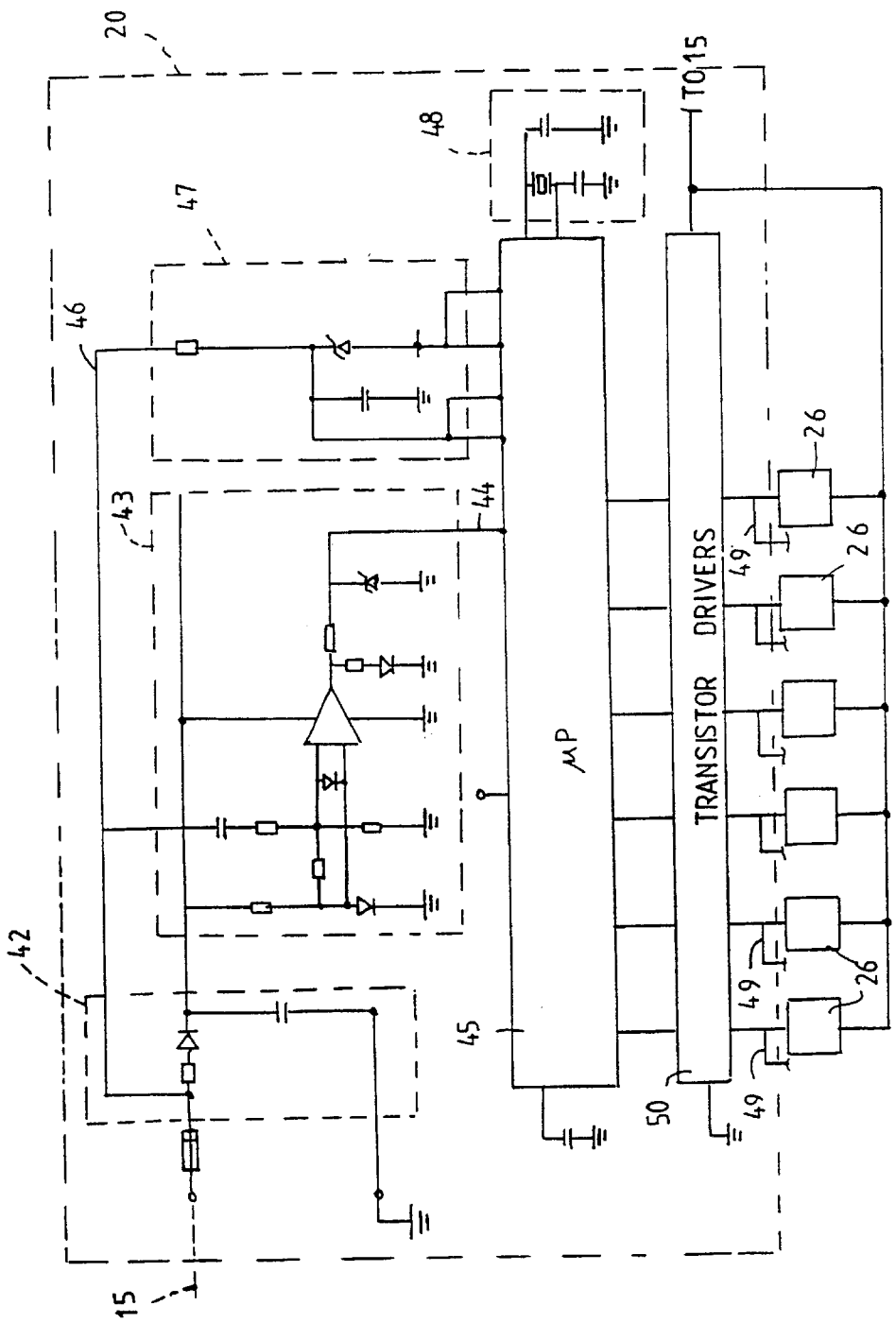
FIG. 4 is a circuit diagram of the part of the connecting device of FIG. 2 associated with the signal receiver arrangement of the connecting device.

A switch 27 is provided in the power supply conductor 15 before the contact 17 to allow power supply to the contact 17 to be switched off. The power to the contact 17 will usually be switched off when the coupling members 13 and 14 are disengaged. A fuse 37.1 is provided as shown in FIG. 2.

In use the ball member 13 will pivot in the receptacle 24 of the socket member 14 when connected to each other and when the towing vehicle is towing the towed vehicle. During such movement the contacts 17 and 18 will remain in contact with each other and will slidingly engage each other.

The contact 17 comprises a disc with a curved contact surface which is provided in a receptacle in the ball member 13 and an insulating means 28 insulates the contact 17 from the ball member 13.

The contact 18 is slidingly mounted in an aperture 29 in the socket member 14 and is biased by means of a spring 30 into the receptacle 24. An insulating member 31 insulates the contact 18 from the socket member 14.

In this preferred embodiment of the invention the only electrical contact between the towing and towed vehicles is established through the contacts 17 and 18.

The signal transmitter arrangement 19 includes an encoder in the form of a microprocessor 32. The microprocessor is separately connected by means of conductors 33 to each individual power line 34 to the rear lights 11. In this way the microprocessor 32 receives information of the status of the power supplied to the rear lights 11. The microprocessor 32 generates a signal carrying binary information (in the form of a byte long code) which is received via conductor 34.1 by the timer arrangement and current amplification means 35. The signal generated by the microprocessor 32 is responsive to which rear lights 11 power is supplied. Alternatively or additionally it may be responsive to which rear lights 11 power is not supplied.

The timer arrangement and current amplification means 35 generates an oscillation control signal with a frequency corresponding to the byte long code received from the microprocessor 32. Means 35 also includes a current amplification means for strengthening the control signal. The control signal is then superimposed by conductor 36 on the direct current supplied from the battery through conductor 37. The power supply conductor 15 is connected to the conductor 37.

Power is supplied to the microprocessor 32 and means 35 from the battery by conductor 37. The power passes through an isolation circuitry 38. The Zener diode 39 prevents voltage spikes from affecting input power to the 555 timer.

The power to the microprocessor 32 also passes through a voltage regulator 40, which regulates the 12V-battery power to 5V necessary to power the microprocessor 32. A crystal arrangement 41 is also provided to set the internal clock of the microprocessor 32.

The power supply conductor 15 carries the power signal (power from the battery 16) with the control signal superimposed thereon through closed contacts 17 and 18 to the signal receiver arrangement 20.

The signal receiver arrangement 20 includes an isolation circuit 42. A filter and amplifying circuitry 43 separates the power signal PC) and the control signal (AC) and amplifies the separated control signal. The circuitry 43 includes RC filter for separating the power and control signals. An op-amp circuit amplifies the separated control signal.

The separated control signal is received via the conductor 44 by a decoder in the form of a microprocessor 45. Power to the microprocessor is supplied by means of a conductor 46, and a voltage regulator 47 is provided to regulate 12V-battery power to 5V necessary to power the microprocessor 45. A crystal arrangement 48 is provided to set the internal clock of the microprocessor 45.

The microprocessor 45 decodes the separated control signal received from the circuitry 43 and controls the switches 26 in the power lines 49 to the rear lights 12 in accordance with the control signal received. Transistor drivers 50 act as current amplifying means for amplifying power output from the microprocessor 45 to operate the switches 26.

It will be appreciated that with the connecting device 10 according to the invention the rear lights 12 of the towed vehicle is automatically associated with the rear lights 11 of the towing vehicle when the vehicles are coupled to each other in a towing relationship by means of the coupling members 13 and 14. Due to the fact that a single pair of electrical contacts (17 and 18) are provided the electrical connection between the towing and towed vehicle is much simplified and it is not necessary to use a complicated arrangement of the type described in South African patent 96/1682.

What is claimed is:

1. A connecting device (10) suitable for connecting a towing vehicle with rear lights (11) in a towing relationship to a towed vehicle with rear lights (12) and for actuating the rear lights (12) of the towed vehicle in accordance with the rear lights (11) of the towing vehicle, the connecting device (10) comprising a first coupling member (13) connected or connectable to the towing vehicle; a second coupling member (14) connected or connectable to the towed vehicle, which coupling members (13, 14) are lockingly engageable for connecting the vehicles in a towing relationship; a power supply conductor (15) for supplying power to the rear lights (12) of the towed vehicle from a power supply on the towing vehicle; a pair of interengageable electrical contacts (17, 18) providing in the power supply conductor (15), the pair (17, 18) including a first contact (17) provided on the first coupling member (13) and a second contact (18) provided on the second coupling member (14), the first (17) and second (18) contacts engaging each other when the first (13) and second (14) coupling members lockingly engage each other to allow power to flow through the pair of contacts (17, 18) the device (10) being characterised therein that the device (10) includes a signal transmitter arrangement (19) for transmitting at least one control signal through the power supply conductor (15) when power is supplied to at least one rear light (11) of the towing vehicle to activate the signal transmitter arrangement (19); and a signal receiver arrangement (20) for receiving the at least one control signal from the transmitter arrangement (19) and activating at least one rear light (12) of the towed vehicle in accordance with the at least one control signal received.

2. The device in claim 1 wherein the rear lights (11, 12) on the towing and towed vehicle include a number of lights selected from the group comprising one or more tail lights; one or more brake lights; one or more indicator lights; one or more reverse lights and a number plate light.

3. The device of claim 1 wherein the first and second coupling members (13, 14) comprises a ball and socket arrangement.

4. The device of claim 1 wherein the pair of interengageable electrical contacts (17, 18) slidingly engage each other.

5. The device of claim 4 wherein at least one of the contacts (17, 18) includes a biasing means (30) for biasing the one contact onto the other.

6. The device of claim 1 which includes only one pair of electrical contacts (17, 18) between the first and second coupling members (13, 14) through which the control signals and power pass.

7. The device of claim 1 wherein the signal transmitter arrangement (19) includes an encoder (32) for receiving information of the status of the power supplied to the rear lights (11) of the towing vehicle and the encoder (32) in response thereto generating a signal carrying information corresponding to the status of the rear lights (11) of the towing vehicle.

8. The device of claim 1 wherein the at least one control signal is superimposed on the power signal in the power supply conductor (15).

9. The device of claim 8 wherein the signal transmitter arrangement includes a timer arrangement (35) for generating an oscillating control signal which is superimposed on the power signal.

10. The device of claim 1 wherein the signal receiver arrangement (20) includes a decoder (45) for decoding the control signal received from the transmitter arrangement (19) and for controlling switches (26) in power lines (49) for supplying power to the rear lights (12) of the towed vehicle, thereby to supply power to the said rear lights (12) of the towed vehicle in accordance with the control signal received.

11. The device of claim 8 wherein the signal receiver arrangement (20) includes means for separating the control signal from the power signal.

12. A first part of a connecting device which in use connects with a second part of a connecting device to connect a towing vehicle with rear lights (11) in a towing relationship in a towed vehicle, the first part comprising a first coupling member (13) connectable to a towing vehicle and being suitable to lockingly engage a second coupling member (14) on a towed vehicle for connecting the vehicles in a towing relationship; a power supply conductor (15) through which power can be supplied; a first electrical contact (17) in the power supply conductor (15) which contact is located on the first coupling member (13) in use to engage a second electrical contact (18) on the second coupling member (14) when the first and second coupling members (13, 14) lockingly engage each other; and the first part being characterised therein that the first part includes a signal transmitter arrangement (19) in use associated with rear lights (11) of the towing vehicle for transmitting at least one control signal through the power supply conductor (15) which signals to which rear lights (11) of the towing vehicle power is and/or is not supplied.

13. A second part of a connecting device which in use connects with a first part of a connecting device to connect a towing vehicle with rear lights (11) to a towed vehicle with rear lights (12) in a towing relationship, the second part comprising a second coupling member (14) connectable to a towed vehicle and being suitable to lockingly engage a first coupling member (13) on a towing vehicle for connecting the vehicles in a towing relationship; a power supply conductor (15) through which power can be supplied; a second electrical contact (18) in the power supply conductor which contact is located on the second coupling member (14) in use to engage a first electrical contact (17) on the first coupling member (13) when the first and second coupling members (13, 14) lockingly engage each other; and the second part being characterised therein that the second part includes a signal receiver arrangement (20) for receiving a control signal through the power supply conductor (5) which signals to which rear lights (11) of the towing vehicle power is and/or is not supplied and the signal receiver arrangement (20) in use activating at least one rear light (17) of the towed vehicle in accordance with the control signal received.

14. A vehicle equipped with a first part according to claim 12.

15. A vehicle equipped with a second part according to claim 13.

* * * * *